US006600275B1

(12) United States Patent
Chen

(10) Patent No.: US 6,600,275 B1
(45) Date of Patent: Jul. 29, 2003

(54) REMOTE CONTROL AND ADJUSTABLE DEVICE FOR HALOGEN LAMP

(75) Inventor: Wen Lin Chen, Chong Ho (TW)

(73) Assignee: Arc Technology Co., Ltd., Taipei (TW)

( * ) Notice: Subject to any disclaimer, the term of this patent is extended or adjusted under 35 U.S.C. 154(b) by 0 days.

(21) Appl. No.: 10/163,892

(22) Filed: May 31, 2002

(51) Int. Cl.[7] .................................................. G05F 1/00

(52) U.S. Cl. .................... 315/308; 315/307; 315/292; 315/291; 315/149; 315/312; 315/DIG. 4

(58) Field of Search ................................. 315/308, 307, 315/291, 292, 209 R, 246, 149, 151, 158, 276, 200 R, 312, 316, DIG. 4

(56) References Cited

U.S. PATENT DOCUMENTS

| | | | | |
|---|---|---|---|---|
| 5,828,188 A | * | 10/1998 | Lecheler | 315/309 |
| 6,150,775 A | * | 11/2000 | Kau | 315/308 |
| 6,348,768 B1 | * | 2/2002 | Weng | 315/292 |

* cited by examiner

*Primary Examiner*—Don Wong
*Assistant Examiner*—Tuyet T. Vo

(57) ABSTRACT

A remote control device includes a signal generating device for supplying signals to a processor device, to actuate the processor device to generate and to output a low signal and a high signal, an initializing device including a transistor coupled to the processor device, a diac coupled to the collector of the transistor, and an oscillating device having two or more transistors coupled between the diac and one or more halogen lamps, for energizing the halogen lamps alternatively. The diac may be actuated with different operating times in order to adjust the brightness of the halogen lamps.

7 Claims, 3 Drawing Sheets

REMOTE CONTROL AND ADJUSTABLE DEVICE FOR HALOGEN LAMP

BACKGROUND OF THE INVENTION

1. Field of the Invention

The present invention relates to an adjustable or control device, and more particularly to a remote control device for coupling to and for controlling the halogen lamps and for adjusting the halogen lamps to different brightnesses.

2. Description of the Prior Art

Typical transformer or control devices have been developed for coupling to and for controlling the halogen lamps. For example, the typical control devices may include a number of parts or elements for forming an oscillating circuits, in order to actuate the halogen lamps. However, the control devices may not be used to adjust the brightness of the halogen lamps.

The present invention has arisen to mitigate and/or obviate the afore-described disadvantages of the conventional control devices for halogen lamps.

SUMMARY OF THE INVENTION

The primary objective of the present invention is to provide a remote control device for coupling to and for controlling the halogen lamps.

The other objective of the present invention is to provide a remote control device for adjusting the halogen lamps to different brightnesses.

In accordance with one aspect of the invention, there is provided a remote control device comprising a processor unit, means for supplying initialization signals to the processor unit, to actuate the processor unit to generate and to output a low signal and a high signal, an initializing unit including a first transistor coupled to the processor unit and having a collector and an emitter, and a diac coupled to the collector of the first transistor, at least one halogen lamp, and an oscillating unit coupled to the initializing unit, and including a second transistor and at least one third transistor coupled between the diac of the initializing unit and the halogen lamp. The first transistor is de-energized when the processor unit output the low signal to the first transistor, the low signal may then be transmitted through the collector of the first transistor to the diac in order to actuate the second and the third transistors to energize the halogen lamp, and the emitter of the first transistor may be energized when the processor unit output the high signal to the first transistor, for preventing the diac from being actuated by the high signal.

A transformer unit may further be provided and coupled between the halogen lamp and the oscillating unit.

The initialization signal supplying means includes a receiver unit coupled to the processor unit, for receiving and sending the initialization signals to the processor unit.

The initialization signal supplying means further includes a signal generating device coupled to the processor unit, for sending the initialization signals to the processor unit.

The signal generating device includes a comparator coupled to the processor unit, a power unit having an output terminal, a capacitor and a first resistor coupled between the comparator and the output terminal of the power unit.

The comparator includes a first input terminal coupled to the capacitor, and a second input terminal coupled to a second resistor which is then coupled to the first resistor.

The processor unit includes a processor device, the initialization signal supplying means may further include an oscillator coupled to the processor device for supplying the signal to the processor device.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
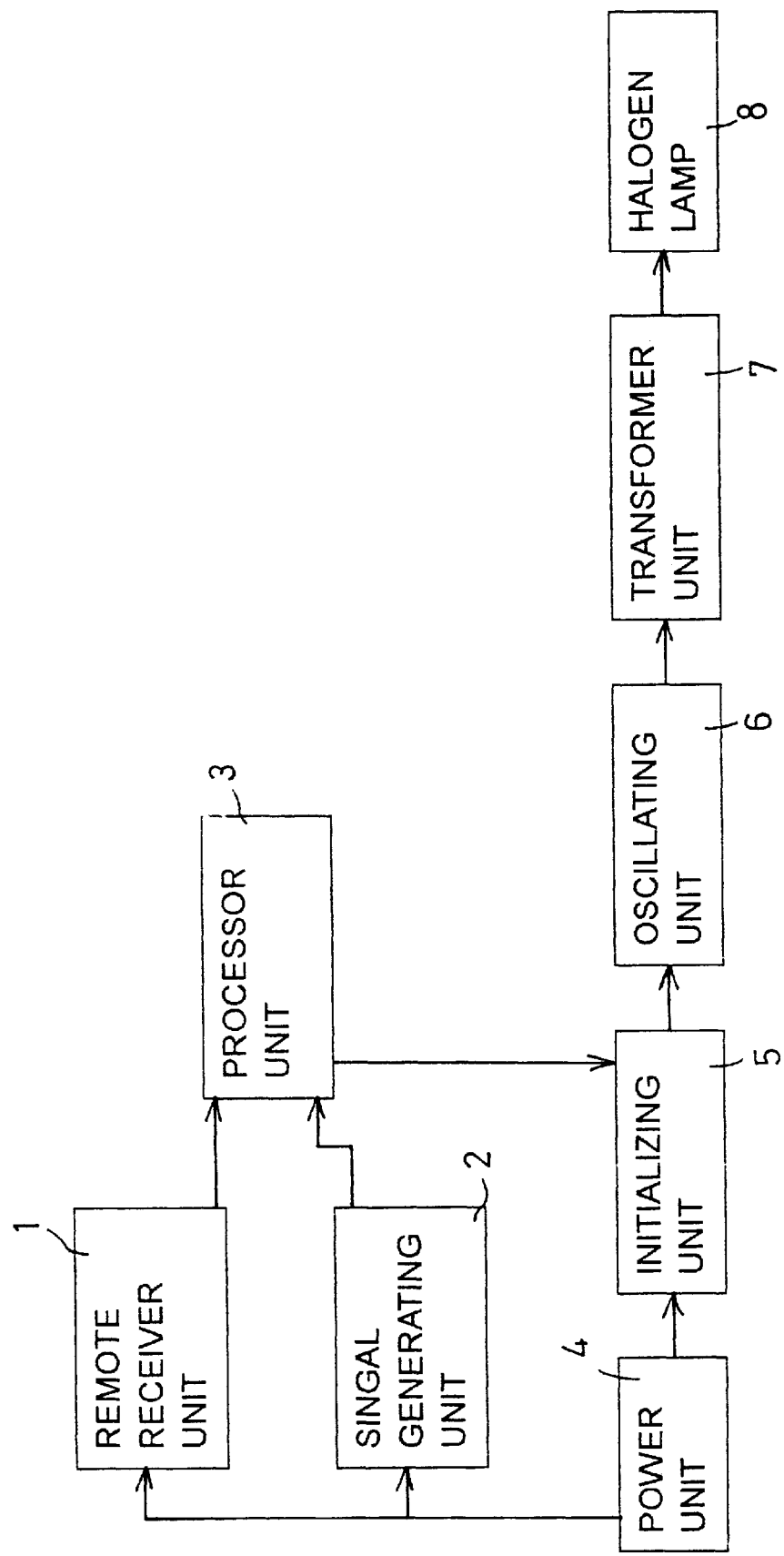
FIG. 1 is a block diagram of a remote control device or halogen lamps in accordance with the present invention.
Figure 2:
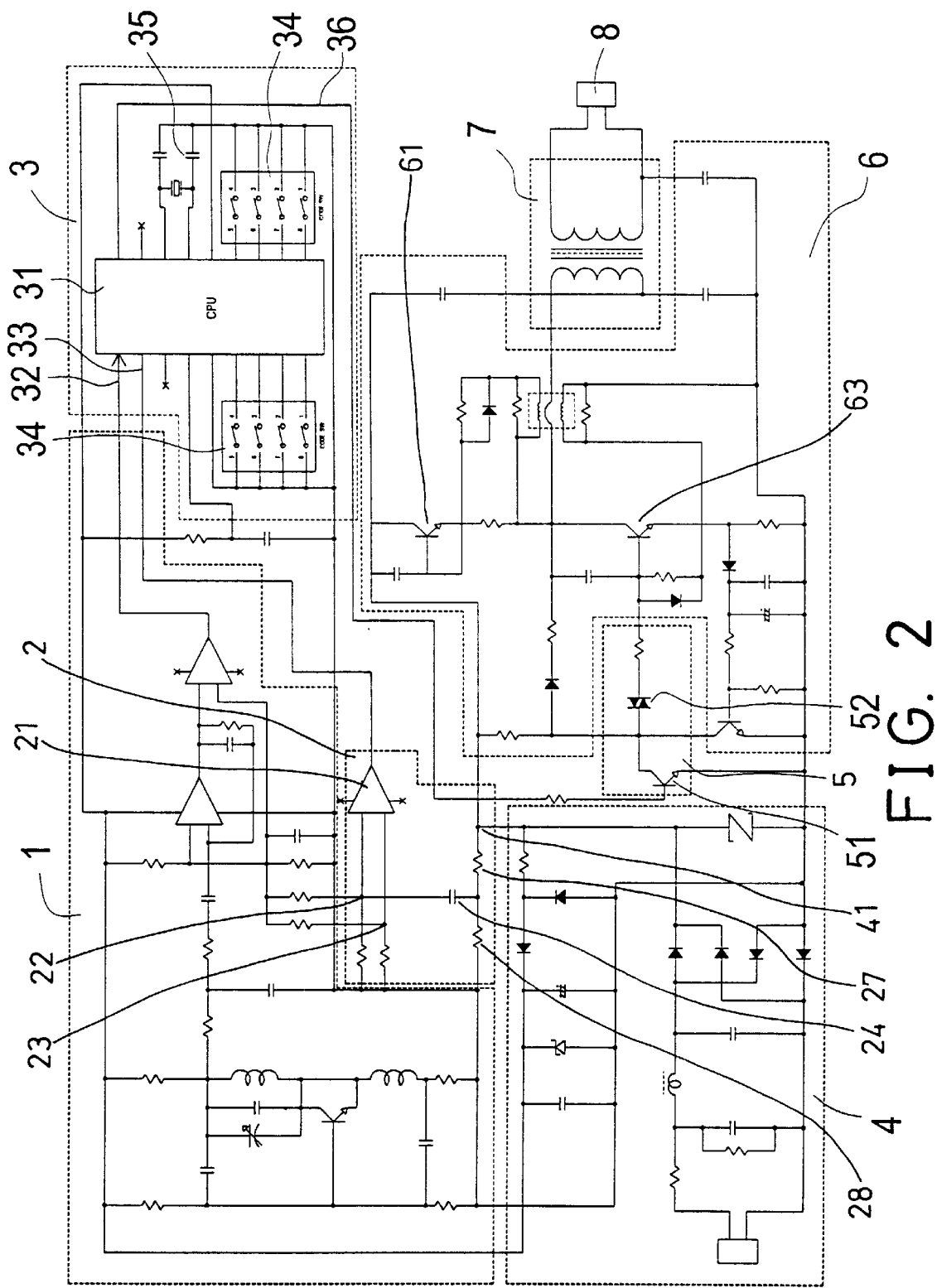
FIG. 2 is a schematic view illustrating an electric circuit of the remote control device.

Referring to the drawings, and initially to FIGS. 1 and 2, a remote control device in accordance with the present invention comprises a processor device or unit 3 including one or more integrated circuits or processor devices 31 each having one or more input terminals 32, 33, and one or more encoders 34 and an oscillator 35 coupled to the processor device 31. A receiver device or unit, such as a remote receiver unit 1 is coupled to the processor unit 3, such as coupled to the input terminal 32 of the processor unit 3, for receiving remote control or actuating or initialization signals and for amplifying and/or rectifying the remote control signals, and for supplying the signals to the processor device 31.

The encoders 34 are coupled to the processor device 31, for supplying one or more fixed or adjustable codes to the processor device 31 as the predetermined codes for the processor device 31. The signals received from the receiver unit 1 may then be compared with the predetermined codes of the processor device 31, for filtering the unwanted signals, or for allowing only the required or the correct signals to enter into the processor device 31.

A signal generating device 2 may further be provided and may include a comparator 21 coupled to the other input terminal 33 of the processor unit 3 for controlling the processor device 31, or for supplying the "on" and "off" signals or the other signals to the processor device 31. The encoders 34 of the processor unit 3 may also be used for comparing the signals received from the signal generating device 2. A power device or unit 4 includes such as one or more batteries or the other power circuits, coupled to the receiver unit 1, and/or the signal generating unit 2 for energizing these units 1, 2 at least.

The signal generating device 2 include a voltage decreasing circuit or device coupled to the comparator 21 which includes two input terminals 22, 23. For example, the voltage decreasing circuit or device 2 includes a capacitor 24 and a resistor 27 coupled in series to an output terminal 41 of the power unit 4; and another resistor 28 coupled between the other input terminal 23 of the signal generating device 2 and the resistor 27. The power unit 4 may energize the voltage decreasing circuit or device 2 to generate and to supply signals to the processor unit 3.

The oscillator 35 of the processor unit 3 is coupled to the processor device 31, and may also be used for generating and supplying oscillating or pulse signals to the processor device 31 of the processor unit 3. It is preferable that the signals generated by the oscillator 35 and supplied to the processor device 31 are synchronized with the signals generated and supplied to the processor unit 3 by the voltage decreasing circuit or device 2.

An actuating or initializing device or unit 5 is further provided and coupled between the power unit 4 and the processor unit 3, and includes a transistor 51 having a base coupled to an output terminal 36 of the processor device 31 for being actuated by the processor device 31. An oscillating device or unit 6 includes a transistor 61 having an emitter coupled to a collector of one or more further transistors 63. The initializing unit 5 includes a diac 52 coupled to a collector of the transistor 51, and coupled between the bases of the transistors 61, 63 of the oscillating device or unit 6, for initializing or actuating or operating the transistors 61, 63 of the oscillating device or unit 6 to generate high frequency output signals.

The oscillating device or unit 6 is then coupled to one or more halogen lamps 8 via a transformer device or unit 7 which may be actuated or initialized by the high frequency output signals generated by the oscillating device or unit 6, in order to generate and supply an alternate current output to the halogen lamps 8, in order to actuate or to energize the halogen lamps 8. The oscillating device or unit 6 may also be coupled to the halogen lamps 8 directly, without the transformer device or unit 7.

In operation, as shown in FIG. 2, for example, when the receiver unit 1 receives and supplies an initialization or starting or "on" signal to the processor device 31, the processor device 31 may then send out an actuating signal to the base of the transistor 51 via the output terminal 36 of the processor device 31. The actuating signal may, such as, be a negative or a low voltage, or a positive voltage less than that of a predetermined or initialization voltage for actuating the transistor 51, such that the transistor 51 may not be initilized or actuated at this moment.

The actuating signal, at this moment, may flow out of the collector of the transistor 51, and may be transmitted to the diac 52. The diac 52 may then be used to actuate the transistors 61, 63 of the oscillating unit 6 alternatively, in order to generate and supply high frequency output signals, and so as to actuate the transformer unit 7 to generate and supply the alternate current output to the halogen lamps 8, in order to actuate or to energize the halogen lamps 8.

When the receiver unit 1 receives and supplies a stop or "off" or a positive or a high voltage signal to the processor device 31, the processor device 31 may then send out a positive voltage signal to the base of the transistor 51 via the output terminal 36 of the processor device 31. At this moment, the emitter of the transistor 51 may be energized or actuated, such that the signal or the current will not flow to the diac 52, and such that the oscillating unit 6 may not be actuated at this moment.

The receiver unit 1, or the signal generating device 2, or the oscillator 35 may be used as a device or a means for supplying a control signal or an initialization or starting signal to the processor device 31, in order to actuate or operate the initializing unit 5 and the oscillating unit 6. The receiver unit 1 and the signal generating device 2 may be energized by the power unit 4, in order to generate and supply pulse signals or the other signals to the processor device 31 in reciprocating action.

Figure 3:
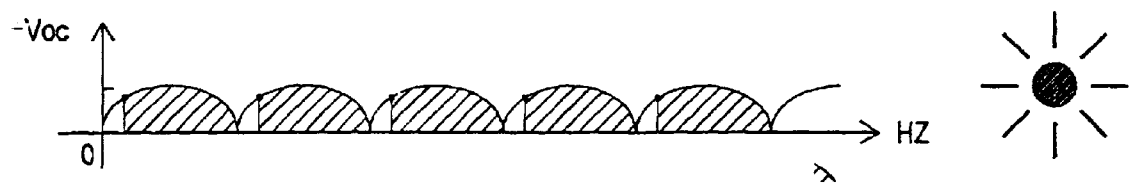
FIGS. 3, 4, 5 are schematic views illustrating the operation of the electric circuit of the remote control device to adjust the brightness of the halogen lamps.
Figure 4:
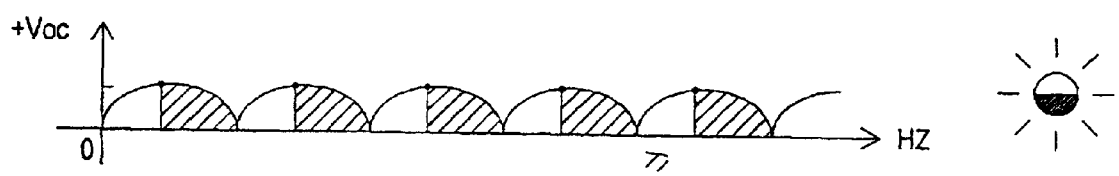
Figure 5:
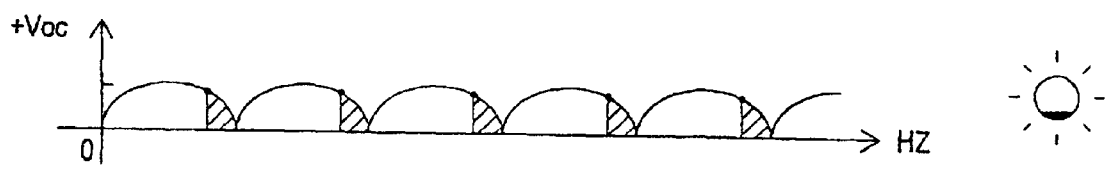

As shown in FIGS. 3–5, the actuating or energizing or operating angle or time of the diac 52 may be controlled or adjusted by the processor device 31 of the processor unit 3, in order to adjust the power to the initializing unit 5 and the oscillating unit 6 and then to the halogen lamp 9. For example, the diac 52 of the initializing unit 5 may be actuated or energized earlier, or may be actuated or energized longer each time, as compared with those shown in FIGS. 4 and 5, in order to increase the power applied to the oscillating unit 6, and so as to adjust the brightness of the halogen lamp 8.

Accordingly, the switch or remote control device in accordance with the present invention may be used for coupling to and for controlling the halogen lamps, or for adjusting the halogen lamps to different brightnesses.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A remote control device comprising:

a processor unit, means for supplying initialization signals to said processor unit, to actuate said processor unit to generate and to output a low signal and a high signal, an initializing unit including a first transistor coupled to said processor unit and having a collector and an emitter, and a diac coupled to said collector of said first transistor, at least one halogen lamp, and an oscillating unit coupled to said initializing unit, and including a second transistor and at least one third transistor coupled between said diac of said initializing unit and said at least one halogen lamp, said first transistor being de-energized when said processor unit output the low signal to said first transistor, the low signal being transmitted through said collector of said first transistor to said diac in order to actuate said second and said at least one third transistors to energize said at least one halogen lamp, and said emitter of said first transistor being energized when said processor unit output the high signal to said first transistor, for preventing said diac from being actuated by the high signal.

2. The remote control device according to claim 1 further comprising a transformer unit coupled between said at least one halogen lamp and said oscillating unit.

3. The remote control device according to claim 1, wherein said initialization signal supplying means includes a receiver unit coupled to said processor unit, for receiving and sending the initialization signals to said processor unit.

4. The remote control device according to claim 1, wherein said processor unit includes a processor device, said initialization signal supplying means includes an oscillator coupled to said processor device.

5. The remote control device according to claim 1, wherein said initialization signal supplying means includes a signal generating device coupled to said processor unit, for sending the initialization signals to said processor unit.

6. The remote control device according to claim 5, wherein said signal generating device includes a comparator coupled to said processor unit, a power unit having an output terminal, a capacitor and a first resistor coupled between said comparator and said output terminal of said power unit.

7. The remote control device according to claim 6, wherein said comparator includes a first input terminal coupled to said capacitor, and a second input terminal coupled to a second resistor which is then coupled to said first resistor.

* * * * *